United States Patent
Laurell

(10) Patent No.: US 7,154,471 B2
(45) Date of Patent: Dec. 26, 2006

(54) COLOR ARRANGEMENT FOR A CURSOR

(76) Inventor: Christer Laurell, Pyrolavagen 27, Lidingo (SE) S-18160

(*) Notice: Subject to any disclaimer, the term of this patent is extended or adjusted under 35 U.S.C. 154(b) by 102 days.

(21) Appl. No.: 10/512,418

(22) PCT Filed: May 13, 2003

(86) PCT No.: PCT/SE03/00779

§ 371 (c)(1), (2), (4) Date: Oct. 25, 2004

(87) PCT Pub. No.: WO03/096174

PCT Pub. Date: Nov. 20, 2003

(65) Prior Publication Data

US 2005/0200602 A1    Sep. 15, 2005

(30) Foreign Application Priority Data

May 14, 2002 (SE) .................................. 0201457

(51) Int. Cl.
*G09G 5/00* (2006.01)

(52) U.S. Cl. .................. 345/156; 345/157; 345/158; 345/160; 345/163

(58) Field of Classification Search ......... 345/156–168
See application file for complete search history.

(56) References Cited

U.S. PATENT DOCUMENTS

| | | | | |
|---|---|---|---|---|
| 4,954,817 A | * | 9/1990 | Levine | 345/179 |
| 5,638,092 A | * | 6/1997 | Eng et al. | 345/158 |
| 5,832,296 A | * | 11/1998 | Wang et al. | 710/3 |
| 5,940,066 A | * | 8/1999 | Weinblatt | 345/179 |
| 6,124,846 A | * | 9/2000 | Goldstein et al. | 345/163 |
| 6,128,004 A | * | 10/2000 | McDowall et al. | 345/158 |
| 6,744,420 B1 | * | 6/2004 | Mohri | 345/157 |
| 6,850,224 B1 | * | 2/2005 | Baughman | 345/163 |
| 2001/0040550 A1 | | 11/2001 | Vance et al. | |

FOREIGN PATENT DOCUMENTS

JP    10301706 A    11/1998

\* cited by examiner

*Primary Examiner*—Amr A. Awad
*Assistant Examiner*—Sameer Gokhale
(74) *Attorney, Agent, or Firm*—David A. Guerra

(57) ABSTRACT

Control arrangement for a cursor (140) on a screen or a display for a computer (130), comprising a hand unit (10) with two sensing elements (20, 30) adapted to be applied on two of the fingers of the user, suitably along the thumb and forefinger, where the intersecting point (80) between the sensing elements controls the position of the cursor. The sensing elements are connected to a processing unit for the determination of the intersecting point between the threads when they are situated next to each other and for the control of the position of the cursor according to this intersecting point.

21 Claims, 3 Drawing Sheets

COLOR ARRANGEMENT FOR A CURSOR

TECHNICAL FIELD

The present invention relates to an arrangement for control of the cursor of a display for a computer.

BACKGROUND OF THE INVENTION AND PRIOR ART

A pointer for moving a cursor on a display for a computer may conventionally consist of a mouse provided with a ball, which is brought to rotate against a plane surface during the movement of the mouse. The relative movement of the mouse in different directions, and the corresponding rotating movements of the ball, cause a corresponding change of the coordinates of the cursor on the screen. A long movement on the screen in a certain direction may be achieved on a small surface by occasionally lifting the mouse during the movement and replacing it in a previous position.

One alternative to a conventional mouse consists of an arrangement comprising a control ball, which in a fixed position can be rotated around an arbitrary axis. The ball is resting in a special cradle, provided with sensors, which translates the movements of the ball into corresponding, relative changes of the coordinates of the cursor. One advantage with this alternative is that long movements in the same direction is easily achieved by a continuous rotation of the ball around the same axis.

In another case, the pointer may comprise a keypad, by means of which a change in the coordinates of the cursor is achieved by a finger being moved over the keypad in various directions, while the finger is lightly pressed against the keypad. A long movement in the same direction can take place in a similar way as with a mouse, by lifting the finger during the movement and replacing it in a previous position.

In order to achieve click functions in the above cases, two keys are normally used, one key for "left click" and "double click" and another key for "right click". In the latter case, in which the pointer comprises a keypad, the "left click" and "double click" functions may alternatively be achieved by a tap with the finger on the keypad once or twice.

In the example mentioned above, it is normally assumed that the user is working at a table or a desk, onto which, at least, the pointer, keyboard and possibly also the screen are placed. A pointer, in particular, requires actually that an essentially plane surface with a certain area is available for the movements of the mouse. In other cases, the conditions may be different, for example when a table arrangement or the equivalent is missing. Hereby, a need exists for a different kind of pointer, which can be directly activated by the user without any need for an underlying surface. One example of this is described in Patent Abstracts of Japan 10301706A. This pointer comprises a small, short stick for movement of the cursor on the screen. The stick is mounted on a cylindrically shaped housing, which can be slipped on one of the forefingers. The pointer also comprises switches for the click functions corresponding to the left and right clicks on a mouse, and a radio transmitter for transferring relevant signals to a host computer. According to another example, described in Patent Abstracts of Japan 11015597A, a pointer with a fixed part and a movable, fingertip-handled ball is used. The fixed part comprises a holder for the ball and is provided with a click function. The fixed part is also provided with a string to be applied to a finger.

A disadvantage with the above described pointers is that the devices for adjusting the coordinates of the cursor on the screen, i.e. the short stick in the first case and the ball in the second case, have small dimensions, thereby making their handling more difficult compared to the previously described pointers. This is also the case for the devices controlling the click functions. A high accuracy in finger movements is required and more time may be needed in order to exactly adjust the coordinates of the cursor and activate a click function, especially for a person having a limited fine-motoric ability.

The use of a pointer for the control of the cursor of a computer screen or display is a risk factor for strain injuries. The use of a ordinary computer mouse for a stationary computer may cause pain, i.a. in the right of left arm and in the corresponding shoulder and wrist.

Thus, a need exists of an improved pointer for control of a cursor, both for large, stationary computer screens, portable computers (laptops), small palmtop displays and so called screenglasses, which reduces the risk for strain injuries, which does not require a plane surface or a special keypad on the computer, and which, at the same time, is easy to handle and has an efficient click function, and which can be easily handled by persons with a limited fine-motoric ability, as well.

DESCRIPTION OF THE INVENTION

The object of the present invention is to provide a novel and improved control arrangement for the cursor on a screen or display for a computer, which does not require any plane surface, which reduces the risk for strain injuries on the user, which is easy to handle, including efficient click functions which can be used when the person is walking around or are moving in any other way. The term computer is defined as a unit, comprising a CPU (Central Processing Unit), connected to the screen or the display.

These and other objects are achieved by the control arrangement according to claim 1. The control arrangement for a cursor on a screen or display for a computer comprises a hand unit with two sensing elements adapted to be applied along two fingers of the user. The sensing elements are brought in contact with each other in a point of intersection when the user is moving his fingers in relation to each other, the location of the intersecting point controlling the position of the cursor on the computer screen. The sensing elements are connected to a processing unit for the determination of the intersecting point between them when they are situated next to each other and for the control of the position of the cursor in two mutually perpendicular directions depending on the intersecting point.

Since the computer user can handle the control arrangement by a thumb and a forefinger, which is a high precision fingergrip that does not require a high fine-motoric ability, en efficient control of the cursor is achieved. Since the hand normally is relatively well equipped for using such a grip in many other contexts, the risk of strain injuries is small. Furthermore, no plane surface is required, and the hand unit can be used even though the computer user is mobile, for example by walking around.

The processing unit may comprise devices for measuring the resistance of the sensing elements and for determining the coordinates of the intersecting points from these measurements.

In order to achieve a select function, corresponding to a left click, double click or right click on a conventional computer mouse, one of the fingers, along which a sensing element is applied, can be quickly lifted twice and pressed against the other finger, along which a second sensing element is applied. By pressing the thumb against the forefinger, to the left and to the right, respectively, a left click can be distinguished from a right click.

A select function may also be achieved by quickly pressing a sensing element, applied along a finger, twice against another finger, along which no sensing element is applied.

The sensing elements may be formed from two stripes, of which one of the stripes has a comparatively higher resistance than the other stripe, which is a good conductor with a low resistance. At least one of the stripes has a resistance adapted to enable a determination of the coordinates. An electrically insulating layer of a flexible material is located between the stripes. Very little energy is needed to press the stripes together, through the electrically insulating layer, in order to bring them in electrical contact with each other. The stripes may also be applied on the inside of a pipe, which at least partly is made of a flexible material. The flexible part of the pipe is resiliently decompressed when the pressure is released, thereby interrupting the electrical contact between the stripes. The pipe may be hermetically sealed and filled with air or any other gas. A hand unit formed of such sensing elements may also be arranged to control the position of the cursor in third direction, which is perpendicular to the two first directions, by a finger, along which a sensing element is applied, being pressed against a finger along which no sensing elements is applied.

Another possible embodiment of the sensing element comprises wires having a uniform resistivity, so called resistance wires, which are brought in electrical contact with each other in their intersecting point.

The sensing elements may be attached along the thumb and another finger, preferably the forefinger, of a glove, or attached along the fingers to be used by fastening means, such as, for example, by means of rings, clamps, fingerstalls or by glue.

The processing unit may be arranged in a bracelet adapted to be applied around the wrist of the user.

The software of a computer controls the cursor, and a constant movement in a certain direction may be achieved by the intersecting point of the sensing elements being located in one of the end points of the sensing elements, corresponding to the end points of a coordinate axis.

Parameters regarding the control arrangement may be adjustable in the computer, such as the sensitivity of the movement of the cursor over the screen in relation to a movement of the intersecting point of the sensing elements.

BRIEF DESCRIPTION OF THE DRAWINGS

The invention will now be described in more detail, with reference to the FIGS. 1–4, of which FIGS. 4a and 4b is a cross section of an embodiment of a sensing element formed as a rectangular pipe, of which FIG. 4a shows the pipe in an unaffected state, while FIG. 4b shows the pipe in affected state.

DETAILED DESCRIPTION OF THE INVENTION

Figure 1:
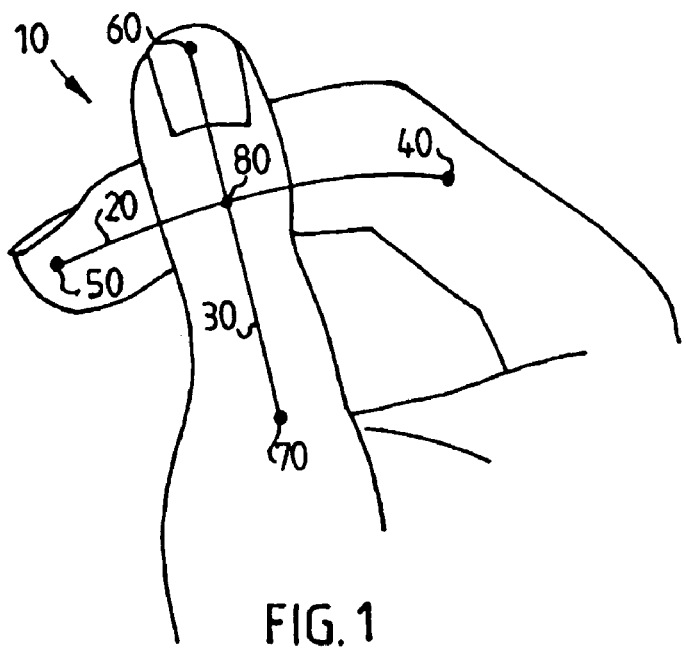
FIG. 1 shows a computer users thumb and forefinger, along which sensing elements are applied.

The invented control arrangement for a cursor comprises a hand unit with two sensing elements, which in a preferred embodiment of the invention are formed as two threads adapted to be applied along two of the computer users fingers, which preferably consist of the thumb and forefinger of one hand of the user. Thus, the threads will follow the movements of the thumb and the forefinger, and the threads correspond to two orthogonal axes, which determine the position of the cursor on a computer screen or display. Instead of on these fingers, the threads may be applied along the thumb and another finger on the same hand, or on an optional finger on one hand and an optional finger on the other hand.

The intersecting point between the threads when they are situated next to each other controls the position of the cursor on the computer screen, and when the intersecting point between the threads changes through movements of the thumb and forefinger, the cursor is also moved across the screen. In this way, the position of the cursor on the screen is controlled by the movements of the thumb and forefinger when the thumb and forefinger are situated next to each other so that the threads, thereby, also are situated next to each other. When the treads are not situated next to each other, the cursor is steady on the screen.

Selection, i.e. a function activation that may correspond to a left click, double click or right click on a conventional computer mouse, may be performed by the user quickly lifting one finger and replacing it against the other finger. Left- and right click, respectively, may be distinguished by the user utilizing the thumb and pressing it to the left side and to the right side against the forefinger, respectively.

A select function may also be implemented by pressing a sensing element, which is applied along the thumb, twice against a third finger, which is not provided with any sensing element.

Various select functions may also be performed in other ways that can be controlled by software in the computer. The sensitivity in the movements of the cursor at a relative movement of the fingers in relation to each other is controllable by the software.

Certain parameters regarding the control arrangement are preferably easy to adjust by the user in the computer, such as e.g. the sensitivity of the cursor movements and the speed of the double click.

According to a preferred embodiment, a processing unit is connected to end points of the sensing elements, the processing unit comprising measuring arrangements for resistance values, such as a voltage source and an amperemeter. This processing unit may be shaped as a bracelet intended to be attached around the wrist of the user. The measuring devices are continuously measuring the resistance between certain endpoints of the sensing elements by applying a voltage and measuring the current. The processing unit registers changes in the measured resistance and transforms them into changes in coordinates of the intersecting point between the sensing elements and forwards the results to the computer for control of the cursor.

FIG. 1 illustrates a hand of a computer user, the hand provided with a hand unit 10, the thumb and forefinger provided with sensing elements 20, 30 according to the invention. A change of the position of the thumb in relation to the forefinger corresponds directly to a change in the position of the cursor on a computer screen. The relative position of the fingers is determined by using two mutually perpendicular axes, such as an x-axis on the forefinger and an y-axis on the thumb, wherein a change of the intersecting point 80 between the axes corresponds to a change of the coordinates of the cursor. A large change of the position in a certain direction may be achieved by repeatedly lifting and setting down the thumb in a different position. Thus, the movement of the cursor follows the relative movement of the thumb and forefinger in relation to each other, when they are in contact with each other.

Thus, the hand unit 10 comprises two sensing elements, which preferably are shaped as threads 20, 30 and suitably are attached along one side of the forefinger and along the lower side of the thumb, for example sewed into a glove. The treads can be regarded as the axes of a two-dimensional coordinate system, and in FIG. 1 the thread 30 on the thumb constitutes the y-axis while the thread on the forefinger 20 constitutes the x-axis. The sensing element 20 has endpoints 40, 50 while the sensing element 30 has endpoints 60, 70. The sensing elements are brought in contact with each other in an intersecting point 80 with the coordinates x (the distance between 50 and 80) and y (the distance between 60 and 80). These coordinates may be determined by measuring several values of the electrical resistance of the sensing elements. By continuously measuring the resistance value, continuous values of the coordinates of the intersecting point between the sensing elements 20, 30 can be obtained.

These measurings and calculations are preferably performed by a processing unit connected to endpoints of the sensing elements, and shaped e.g. as a bracelet, such as in a preferred embodiment of the invention.

According to a second embodiment of the invention, the necessary calculations are performed by a corresponding processing unit which is integrated with the computer and which communicates wirelessly with the hand unit by means of a radio link. The radiofrequency signal from the computer is received by passive circuits in the hand unit, which passive circuits transmit a resonant signal from which the computer continuously can calculate the coordinates of the intersecting point, and the movement of the cursor is controlled according to the movement of the intersecting point.

Scaling of the coordinates of the intersecting point may be desirable in order to achieve a suitable relation between the changes of these coordinates and the corresponding coordinates of the screen cursor. This may take place in the processing unit or in the computer by multiplicating the coordinates with a suitable scaling factor.

The sensing units, which suitably are shaped as threads, may be sewed into a glove or provided with fastening means for application on the fingers of the computer user, such as e.g. rings, clamps, fingercups or glue. The intersecting point 80 between the coordinate axes indicates the position of the cursor, and when it is moved by the thumb and forefinger being moved while situated next to each other, the cursor is moved across a screen or display. When the thumb and forefinger are not situated next to each other, the cursor remains steady. By the user repeatedly lifting the thumb and setting it down to the left and pulling it to the right, the cursor may be moved an optional distance to the right. Correspondingly, the cursor may be moved an optional distance upwards or downwards by repeated movements of the forefinger. When the intersecting point of the axes are located in one of the endpoints 40, 50, 60, 70 of the axes, a constant movement of the cursor into that direction is accomplished. The sensitivity of the movement of the cursor, i.e. the moved distance of the cursor at a certain moved distance of the finger, is controlled by software in the computer.

Figure 2:
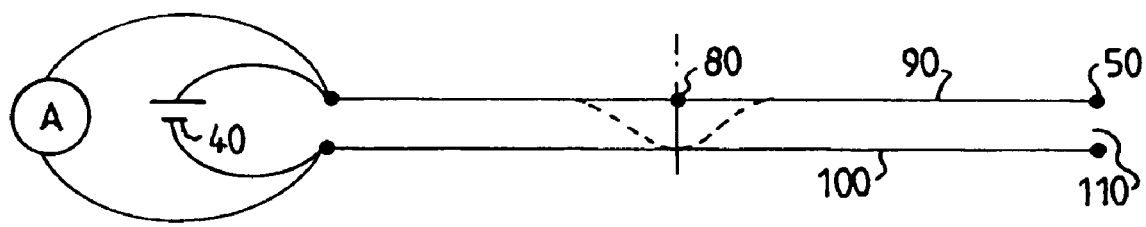
FIG. 2 shows a preferred embodiment of a sensing element.
Figure 4A:
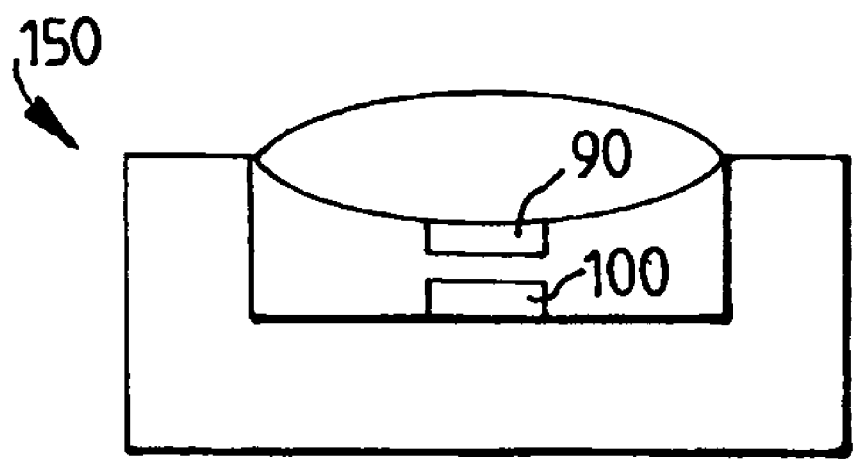
Figure 4B:
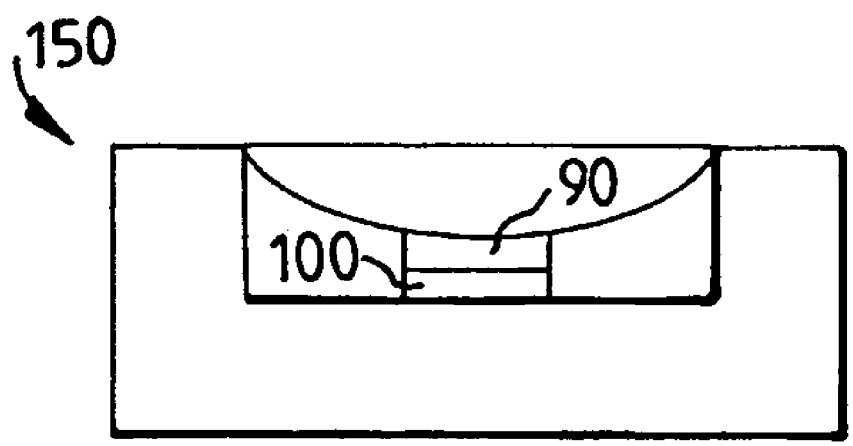

FIG. 2 illustrates a preferred embodiment of a sensing element, formed of two stripes 90, 100, one of which consists of a conducting material and the other of a material with a certain resistivity, with an electrically insulating layer of flexible material 110 between the stripes. At least one of the stripes has a resistans which is high enough to enable a determination of the coordinates. The flexible material may, for example, consist of a gelmaterial. A voltage, U, is applied between the two stripes, and the current A is measured with an amperemeter. Sensing elements are attached by a suitable attachment device on two of the users fingers, such as the thumb and forefinger, whereby an intersecting point 80, between the elements, is achieved by the thumb lightly pressing against the forefinger, causing a current to be conducted between the stripes. According to this embodiment, the measured resistans is proportional to the distance between the endpoint 40 and the intersecting point 80, whereby the coordinates of the intersecting point 80 easily can be calculated. The stripes 90, 100 may also be attached on the inside of a flexible pipe shaped of a non-rigid material, whereby the stripes is brought in contact with each other by a light pressure on the pipe. When the pressure ceases, the flexible pipe is decompressed, whereby the electrical contact between the stripes is interrupted. The pipe may be hermetically sealed and filled with air or an other gas. Since the pressure between the stripes may affect the resistance, the cross-section of the pipe may be designed such that an even pressure between the stripes is obtained in an affected state. FIGS. 4a and 4b shows a possible embodiment of a sensing element formed as a pipe 150 having a rectangular cross-section, with the stripes 90, 100 attached on the inside of two opposite sides of the pipe. Only the side onto which the stripe 90 is attached is deformed at pressure. FIG. 4a shows the cross-section of the pipe in an unaffected state, while FIG. 4b shows the cross-section of the pipe in an affected state.

When the sensing elements are formed like that, the hand unit may also be arranged to control the cursor in a third direction, perpendicular to the two others, by means of a sensing element applied along the thumb, which is pressed against a third finger not provided with any sensing element. This means that a hand unit can be used at 3-D-vision on the screen. The thumb against a third finger may optionally correspond to the scrolling wheel on a mouse, or may be adapted to influence the value of a parameter, e.g. for the control of the volume, brightness or contrast of the screen.

According to a second embodiment of the invented control arrangement, the sensing elements are formed from wires with a uniform resistivity, e.g. so called resistance wires, which may be a metallic thread formed of a particular alloy. In order to find out the coordinates of the intersecting point between wires with a uniform resistivity, the resistance must be measured between several endpoints on the hand unit. If the resistance between the endpoints 50 and 60 in FIG. 1 is indicated by $R_{11}$, the resistance between the endpoints 50 and 70 is indicated by $R_{12}$, and the total resistance for the y-axis between the endpoints 60 and 70 is indicated by $R_y$, the coordinates x (the distance between 50 and 80) and y (the distance between 60 and 80) for the intersecting point can be calculated by means of the following equations:

$$X=(R_{12}+R_{11}-R_y)/2 \qquad (1)$$

And $$Y=R_{11}-X \qquad (2)$$

Besides the resistances $R_{11}$ och $R_{12}$ in the equations (1) and (2) additional methods exist for the selection of a pair of resistance values for the calculation of x and y. In this case, the resistances between the endpoints 40 and 60 and between the endpoints 40 and 70 must be measured, as well. The pairs have to consist of "adjacent" resistance values. In the equations, it is assumed that the total resistances $R_x$ and $R_y$ for the sensing elements constituting the x-axis and the y-axis, respectively, are known or is measured. The three other methods are not described here in detail, but they offer a possibility to control the deviations in a result caused by defects in the sensing elements. An alarm of an error may be transmitted to the user as an otical or a sounding signal.

Figure 3:
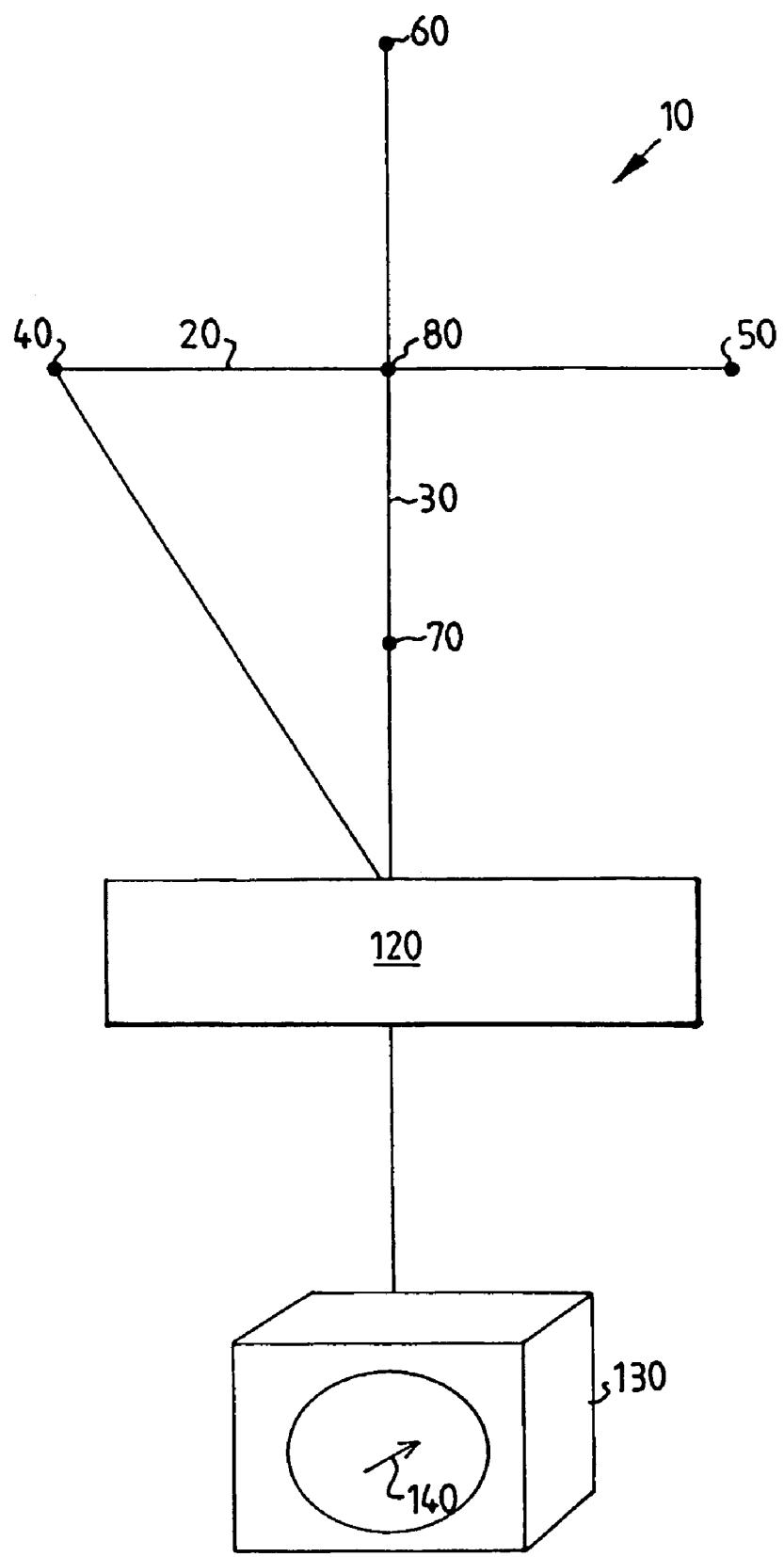
FIG. 3 is a schematical figure of a hand unit, comprising sensing elements connected to a processing unit, which in turn is connected to the computer.

FIG. 3 shows a preferred embodiment of the control arrangement, comprising the two sensing elements 20, 30, which constitute the x-axis och y-axis in a coordinate system, of which the coordinates of the intersecting point 80 between them control the position of a cursor on a computer screen. The endpoints 40 and 70 are connected to a processing unit 120, comprising measuring devices, such as a voltage source and an amperemeter, which apply a voltage over some of the endpoints and measure the current, whereby the x-coordinate and the y-coordinate, respectively, of the intersecting point of the sensing elements may be determined. The processing unit may, for example, be arranged in a bracelet to be attached around the wrist of the computer user. The coordinates of the intersecting point of the sensing elements, calculated by the processing unit, are transferred to the computer, preferably by a radio link, such as, for example, by Bluetooth, but a non-wireless connection is possible, as well. Software in the computer processes the values of the coordinates received from the processing unit and controls the position of the cursor.

The present invention is not limited to the above described embodiments, and may be modified within the scope of the appended claims.

The invention claimed is:

1. A control arrangement for a cursor on a screen or display for a computer, characterized by a hand unit comprising two sensing elements adapted to be applied along two fingers of the computer user, and adapted to be brought in contact with each other in an intersecting point, which controls the position of the cursor on the screen, wherein the sensing elements are connected to a processing unit for the determination of the intersecting point between the sensing elements when they are situated next to each other and for the control of the position of the cursor in two mutually orthogonal directions depending on this intersecting point; and wherein said sensing elements are each formed as a stripe.

2. The control arrangement according to claim 1, characterized by that said sensing elements are each formed of two stripes having end points, one of which having a comparatively higher resistance than the other one, and are provided with an electrically insulating layer of flexible material located between said stripes, and said control arrangement further comprising a processing unit comprising means for measuring the resistance of the sensing elements for determination of the coordinates of their intersecting point.

3. The control arrangement according to claim 2, characterized in that the hand unit is adapted to achieve a select function by one of the fingers, along which a sensing element is applied, being quickly lifted twice and pressed against the other finger, along which a sensing element is applied.

4. The control arrangement according to claim 3, characterized in that said hand unit is adapted to achieve a select function by one finger, along which a sensing element is applied, being quickly pressed twice against a second finger, along which no sensing element is applied.

5. The control arrangement according to claim 1, characterized in that said hand unit is adapted to control the position of the cursor on the screen in a third direction, perpendicular to the two first directions, by a sensing element applied along a finger being pressed against another finger along which no sensing element is applied.

6. The control arrangement according to claim 1, characterized in that said sensing elements are provided with attachment means for application along the fingers of the user.

7. The control arrangement according to claim 1, characterized in that said sensing elements are attached along the thumb and another finger in a glove.

8. The control arrangement according to claim 1, characterized in that said processing unit is arranged in a bracelet intended to be applied around the wrist of the user.

9. A control arrangement for a cursor on a screen or display for a computer, said control arrangement comprising:
   a hand unit having at least two sensing elements adapted to be applied along two fingers of the computer user, and adapted to be brought in contact with each other in an intersecting point, which controls the position of the cursor on the screen;
   a means for measuring the resistance of said sensing elements for determination of the coordinates of their intersecting point; and
   a processing unit connected to said sensing elements for the determination of the intersecting point between the sensing elements when they are situated next to each other and for the control of the position of the cursor in two mutually orthogonal directions depending on this intersecting point;
   wherein said sensing elements are formed of two stripes having end points, said stripes being adapted to be applied on the inside of a pipe.

10. The control arrangement according to claim 9, characterized in that said pipe is gas filled, said pipe at least partly being made of a flexible material.

11. The control arrangement according to claim 10, characterized in that said processing unit is arranged in a bracelet intended to be applied around the wrist of the user.

12. The control arrangement according to claim 11, characterized in that said hand unit is adapted to control the position of the cursor on the screen in a third direction, perpendicular to the two first directions, by a sensing element applied along a finger being pressed against another finger along which no sensing element is applied.

13. The control arrangement according to claim 9, characterized in that said hand unit is adapted to achieve a select function by one of the fingers, along which a sensing element is applied, being quickly lifted twice and pressed against the other finger, along which a sensing element is applied.

14. The control arrangement according to claim 13, characterized in that said hand unit is adapted to achieve a select function by one finger, along which a sensing element is applied, being quickly pressed twice against a second finger, along which no sensing element is applied.

15. A control arrangement for a cursor on a screen or display for a computer, said control arrangement comprising:
   a hand unit having at least two sensing elements adapted to be applied along two fingers of the computer user, and adapted to be brought in contact with each other in an intersecting point, which controls the position of the cursor on the screen;

a means for measuring the resistance of said sensing elements for determination of the coordinates of their intersecting point; and a processing unit connected to said sensing elements for the determination of the intersecting point between the sensing elements when they are situated next to each other and for the control of the position of the cursor in two mutually orthogonal directions depending on this intersecting point;

wherein said sensing elements are formed of two stripes, said stripes being wires having end points and a uniform resistivity.

16. The control arrangement according to claim 15, characterized in that said sensing elements are provided with attachment means for application along the fingers of the user.

17. The control arrangement according to claim 15, characterized in that said sensing elements are attached along the thumb and another finger in a glove.

18. The control arrangement according to claim 15, characterized in that said processing unit is arranged in a bracelet intended to be applied around the wrist of the user.

19. The control arrangement according to claim 15, characterized in that said computer is adapted to control the cursor on the screen in a constant movement in a certain direction when the intersecting point of the sensing elements is located at any of the end points of the sensing elements.

20. The control arrangement according to claim 15, characterized in that said hand unit is adapted to achieve a select function by one of the fingers, along which a sensing element is applied, being quickly lifted twice and pressed against the other finger, along which a sensing element is applied.

21. The control arrangement according to claim 20, characterized in that said hand unit is adapted to achieve a select function by one finger, along which a sensing element is applied, being quickly pressed twice against a second finger, along which no sensing element is applied.

* * * * *

UNITED STATES PATENT AND TRADEMARK OFFICE
CERTIFICATE OF CORRECTION

PATENT NO. : 7,154,471 B2  Page 1 of 1
APPLICATION NO. : 10/512418
DATED : December 26, 2006
INVENTOR(S) : Christer Laurell It is certified that error appears in the above-identified patent and that said Letters Patent is hereby corrected as shown below:

On the title page item (54), and col. 1, line 1, "COLOR" should read --CONTROL--.

Signed and Sealed this

Fifteenth Day of April, 2008

JON W. DUDAS
*Director of the United States Patent and Trademark Office*